United States Patent [19]
Cretegny et al.

[11] Patent Number: 5,949,759
[45] Date of Patent: Sep. 7, 1999

[54] FAULT CORRELATION SYSTEM AND METHOD IN PACKET SWITCHING NETWORKS

[75] Inventors: Andre Cretegny, Vence; Catherine Gallian, Cagnes-sur-Mer; Laurent Nicolas, Villeneuve-Loubet; Yves Ouvry, Saint Laurent du Var; Benoit Sirot, Saint-Jeannet; Gilles Wozelka, Cagnes-sur-Mer, all of France

[73] Assignee: International Business Machines Corporation, Armonk, N.Y.

[21] Appl. No.: 08/752,404

[22] Filed: Nov. 19, 1996

[30] Foreign Application Priority Data

Dec. 20, 1995 [EP] European Pat. Off. ............. 95480193

[51] Int. Cl.⁶ ..................................................... H04J 3/14
[52] U.S. Cl. .................... 370/250; 370/218; 371/22.4; 371/25.1; 371/26
[58] Field of Search .................................. 370/216, 218, 370/241, 244, 250, 507, 520; 371/20.1, 22.4, 25.1, 26

[56] References Cited

U.S. PATENT DOCUMENTS

| | | | |
|---|---|---|---|
| 4,142,069 | 2/1979 | Stover | 370/507 |
| 5,276,440 | 1/1994 | Jolissaint et al. | 340/825.02 |
| 5,500,853 | 3/1996 | Engdahl et al. | 370/520 |
| 5,768,256 | 6/1998 | Allen et al. | 370/218 |

FOREIGN PATENT DOCUMENTS 9419887  9/1994  WIPO ............................ H04L 12/24

OTHER PUBLICATIONS

IEEE Trans. on Comm., vol. 42, No. 2/3/4, pp. 523–533, 1994.

Data Communications, vol. 19, No. 4, Mar. 21, 1990, pp. 45–48.

European Search Report.

*Primary Examiner*—Douglas W. Olms
*Assistant Examiner*—Shick Hom
*Attorney, Agent, or Firm*—Gerald R. Woods

[57] ABSTRACT

In case of a failure in a high speed packet switching network, the failure information provided by the multiplicity of resources is registered in the access nodes of the network. The failure information can be retrieved by the network management on request for fault correlation. A plurality of alarms flooding the network management when a failure occurs is thus avoided.

3 Claims, 8 Drawing Sheets

& # x 2 0 ;
FAULT CORRELATION SYSTEM AND METHOD IN PACKET SWITCHING NETWORKS

TECHNICAL FIELD

The present invention relates to Fault Management in large packet switching networks and more particularly to an apparatus and a method for correlating failures and itdentifying the resources affected by said failure.

BACKGROUND ART

The Fault Management discipline in network management systems comprises sets of functions enabling the detection, isolation and correction of abnormal operations in the communication network and its environment. Abnormal operations may relate to events such as physical resource failures (e.g. link outage), communication failures or security violations occurring in the interconnected nodes forming the network.

Functions associated with Fault Management provide, among other ones, the report of alarms which requires on one hand the detection of failures and the report of alarms by the nodes, and on the other hand the presentation of the information related to said failures to network operators. Network operators are responsible for ensuring that the network provides services that users are expecting. This responsibility depends on real time advertisement of network abnormal operations so that appropriate recovery actions can be taken. In order to fulfill this duty, network operators rely on Fault Management, first to be informed on the failure occurrence, and secondly to have correlated fault information on that failure. Fault correlation requires that those resources which are functionally affected by the failure are registered together with the failure and that this correlated information is accessible by the network operators In current networks both, different characteristics and different solutions can be found. Essentially two characteristics of the prior networks have evolved and obstructed the approach of Error correlation:

the current bandwidth available on a given network interface has limited de facto the amount of logical resources served by the physical media, and the logical resources were tightly linked to physical resources which made the network topology very static.

Error correlation functions in this environment can be based on:

information on all the resources affected by a failure in the network with asynchronous notifications raised from the network to the network management system, a posteriori (i.e. after failure occurrence) retrieval of information on a given resource (e.g. verification of the status of a resource), a posteriori verification of the valid connections.

Networking evolves to higher speeds, thus offering appropriate infrastructure for emerging multimedia applications. High speed networking provides physical media transport over 2,000 kilobits per second. When the network provides such a very high bandwidth, then also the number of granular or elementary accesses is very high. Thus, such speeds lead to an increasing number of logical resources (e.g. protocol interfaces, connections) that the physical media can serve. The additional complexity introduced by the large number of supported resources in these new generation networks, requires developing the classical network architecture to a distributed network structure. The classical network architecture associates physical media support with the physical protocol layer, failure detection and some corrections at the link protocol layer and above in higher layers, and network management in applications, whereas emerging networks tend to distribute some network management functions into protocol layers, such as: physical media backup decision and operation by the physical protocol layer, connectivity backup decision and operation by link protocol layers.

Two consequences on Fault Management derive from current network evolution:

one failure will have disruptive effects on a larger amount of applications and users, and one failure will trigger many alarms in the network, related with the affected logical resources The following new requirements derive from this consequence:

the need to correlate a physical resource failure with the logical resources which were previously served by this failed entity, and the need to restrict the overall fault management flow to avoid excessive network bandwidth utilization for network management purpose.

The application of the current solutions to high speed and dynamic networks would lead to a network flooded by network management traffic (mainly due to asynchronous events), and retrieval of wrong information as the network may potentially have decided to redistribute logical resources to new, healthy physical resources. Therefore, when a physical resource failure occurs, the associated alarm would be triggered. Then, each affected logical resource would trigger an alarm and the network operator would be flooded by hundreds of alarms due to one failure without any analysis tool to use.

This demonstrates, that usual correlation algorithms are no longer appropriate to current high speed networks, the main inhibitors being the amount of logical resources and the topology dynamias.

The following new requirements derive from this consequence: the need to correlate a physical resource failure with the logical resources which were previously served by this failed entity, and the need to restrict the overall fault management flow to avoid excessive network bandwidth utilization for network management purposes.

SUMMARY OF THE INVENTION

The solution for the amount of asynchronous notifications related to the failed resources is provided by:

informing the operator of the failure of the physical resources, and keeping the information inside the node for on-request retrieval.

One aspect of the method according to the present invention involves the following steps:

the network operator configures each node in the network to enable logging of required information in a memory of the Network Element, the physical resource triggers an alarm when it is affected by a failure, each affected logical resource logs failure information on reception of the physical alarm, and the operator requests log retrieval for analysis.

The efficiency of this solution can be further increased by building a "correlation key" which is representative of the location of the failure, and by using the flooding mechanism which is used in the distributed networks to transport information which is useful to associate the root cause of the failure with the effects of the failure.

Therefore, another aspect of the method according to the present invention involves the steps of:

on the physical resource failure occurrence, the correlation key is built comprising information on the affected link as it is seen from the respective neighbouring node;

the physical alarm is triggered; it contains the correlation key with location information, which forms part of the alarm data;

the failure information and the correlation key are transmitted to the access nodes of the network;

in the access nodes, the affected logical resources are associated to the physical failure;

the alarm related to the logical resource is built with the correlation key.

BRIEF DESCRIPTION OF THE DRAWINGS

The invention will be better understood in the following description in combination with the Figures, wherein.

DESCRIPTION OF THE PREFERRED EMBODIMENT

Figure 1:
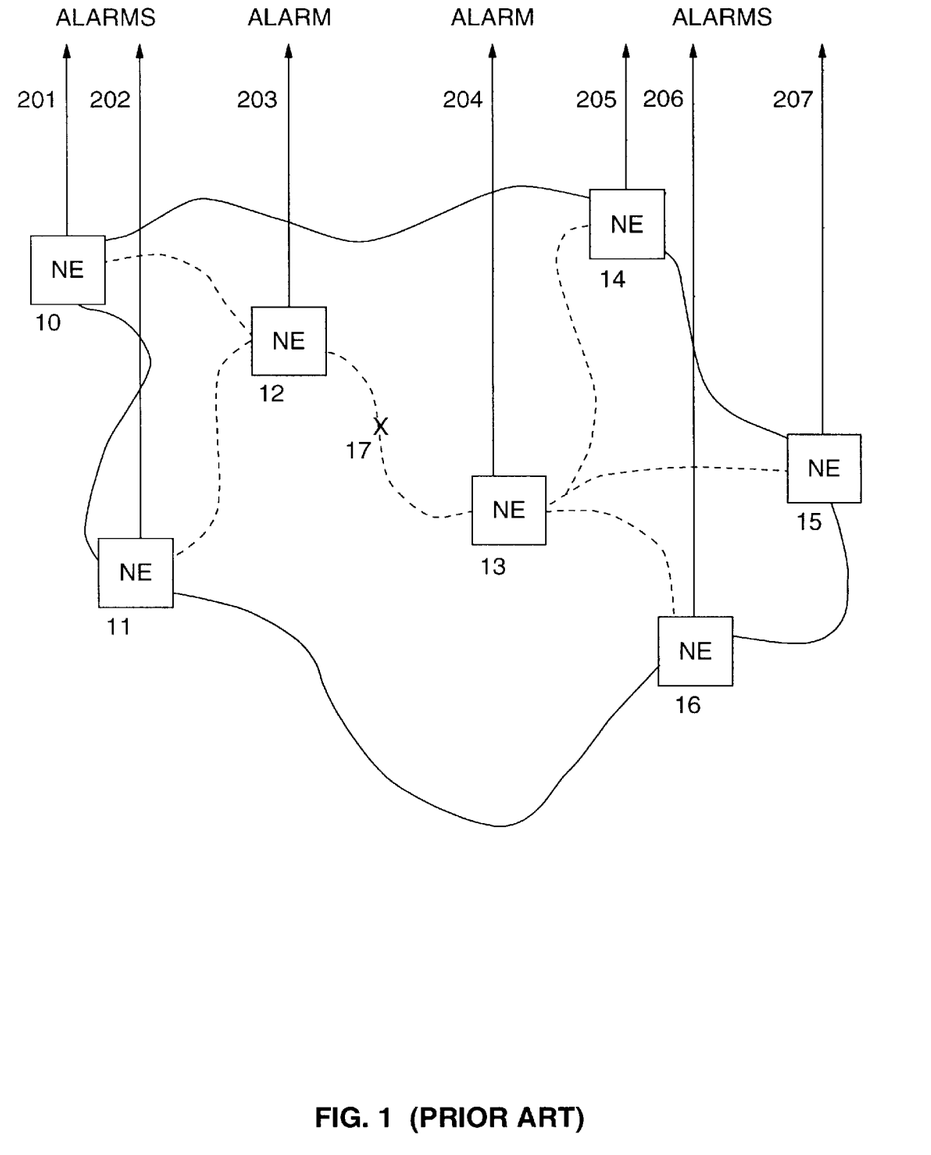
FIG. 1 represents the operation of a prior art network.

The state-of-the-art is illustrated in FIG. 1. As example, a network comprising 7 nodes (i.e. 10, 11, 12, 13, 14, 15 and 16) with 3 end-to-end connections:

one flowing from 10, via 12, 13 to 14, one flowing from 11, via 12, 13 to 15, one flowing from 11, via 12, 13 to 16.

is shown.

When a failure occurs on a link (e.g. failure 17 on link between nodes 12 and 13) affecting the 3 connections served by the link and referenced previously, 7 alarms are triggered: 2 physical alarms, one per failure neighbour node, i.e. alarm 203 and alarm 204 and alarms related with logical resources, i.e. alarms 201, 202, 205, 206 and 207.

Figure 2:
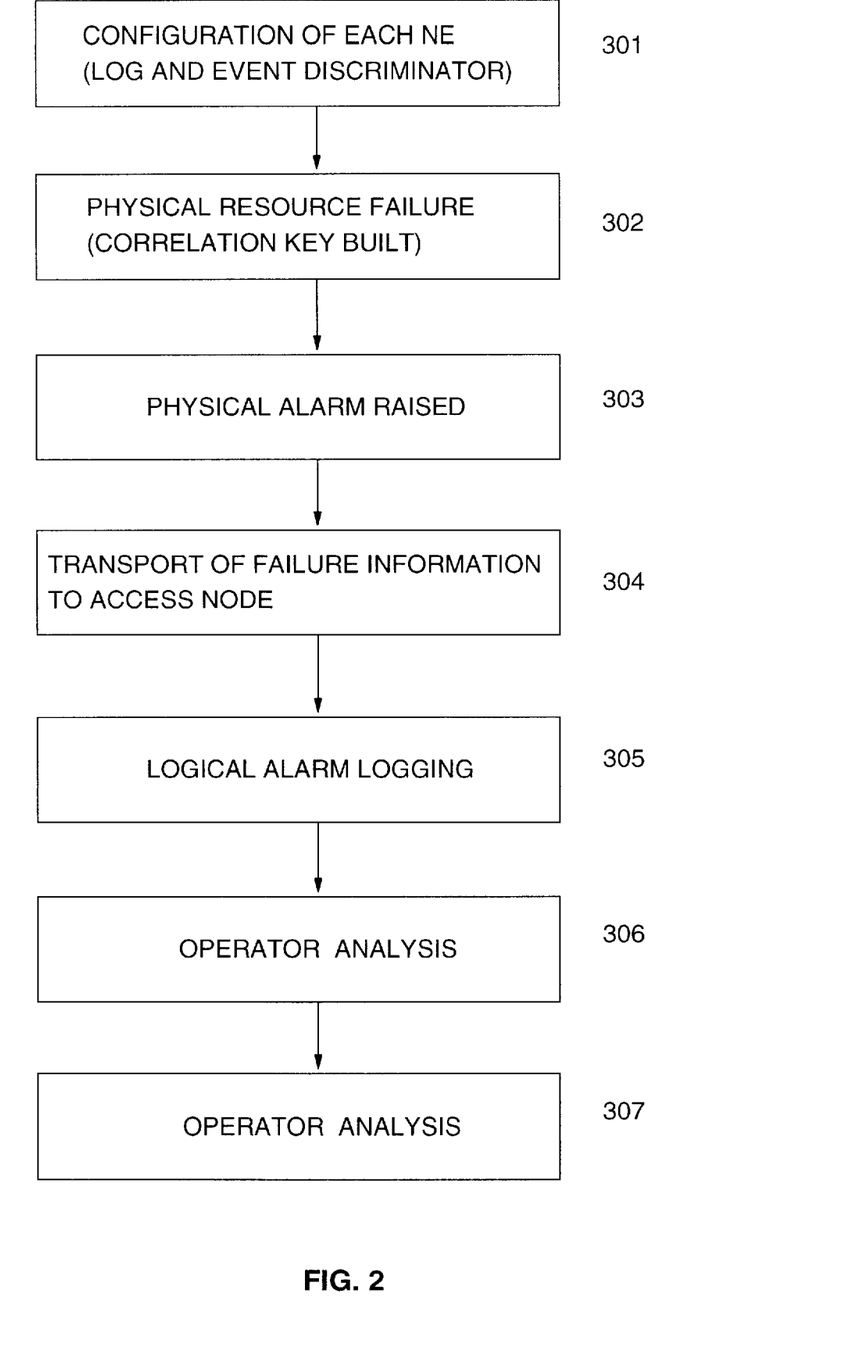
FIG. 2 shows the steps of the method according to the present invention.

The solution according to the present invention for this situation is to provide the method which is shown in FIG. 2.

The network operator configures each node in the network to enable required information logging (step 301). On the physical resource failure occurrence, the correlation keys are built (step 302). The physical alarms are triggered; they contain the correlation keys as part of the alarm data (step 303). The failure information and the correlation keys are transported to the access nodes of the network (step 304). In the access nodes, the affected logical resources are associated to the physical failure and the alarm related to the logical resource is built with the correlation keys (step 305). The logical alarm and the correlation key are kept in the log of the node, according to the log configuration criteria (step 306). On reception of the physical alarm, the operator may request log retrieval for analysis (step 307).

Each step of this method is now explained in detail:

1. The logging characteristics are configured by the network operator as explained in combination with FIG. 3. The network operator will configure an Event Discriminator (i.e. a filter, the filtering criteria of which can be configured) and a Log for each node in the network with the purpose of keeping information needed for error correlation.

The characteristics which can be configured for the Event Discriminator are for example:

object class (i.e. class of resources having the same characteristics), and event type (i.e. type of asynchronous notification) in order to allow alarms related to connection failures to be logged.

The characteristics which can be configured for the Log are for example:

action when the log is full, either set to 'wrap' or to 'halt' (i.e. to overwrite the former content of the log memory or to stop writing information into the log memory), threshold on maximum capacity for a capacity alarm to be triggered before the log completion, and the stop and start logging times in order to have a log ready to receive the notifications.

Figure 3:
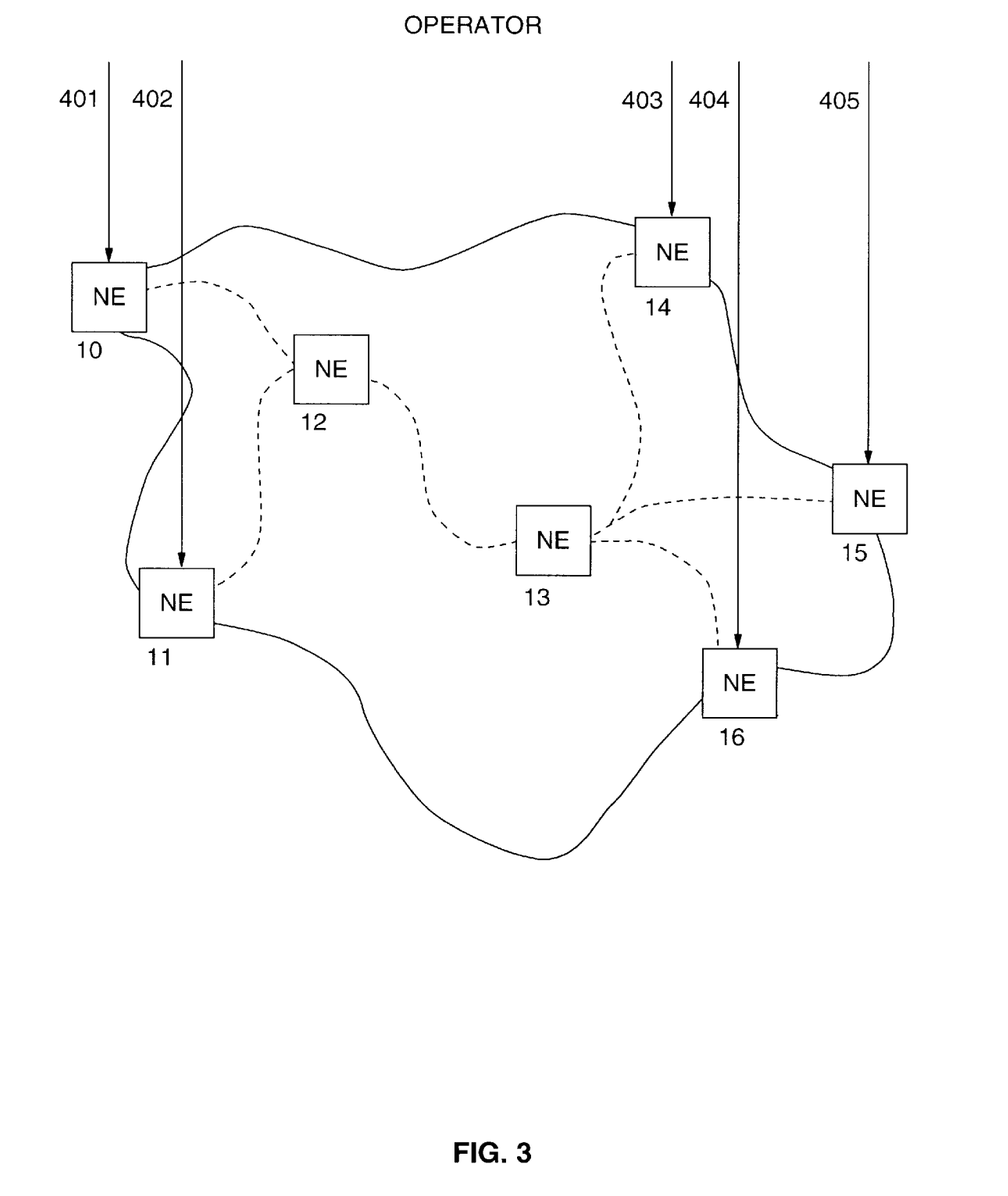
FIG. 3 is a representation of the first step of the method according to the present invention.

The network operator will apply such configuration operations referred to as operations 401, 402, 403, 404,and 405 in FIG. 3, onto each node (i.e. 10, 11, 12, 13, 14, 15, 16) in the network 2. On occurrence of a physical failure, the correlation keys must be built. This process illustrated in FIG. 4 involves each Network Element (i.e. 12 and 13) which detects the physical failure (i.e. failure 17). The node 12 identifies the link to the node 13 as link t1, and the node 13 identifies the link to the Network Element 12 as link t2.

Figure 4:
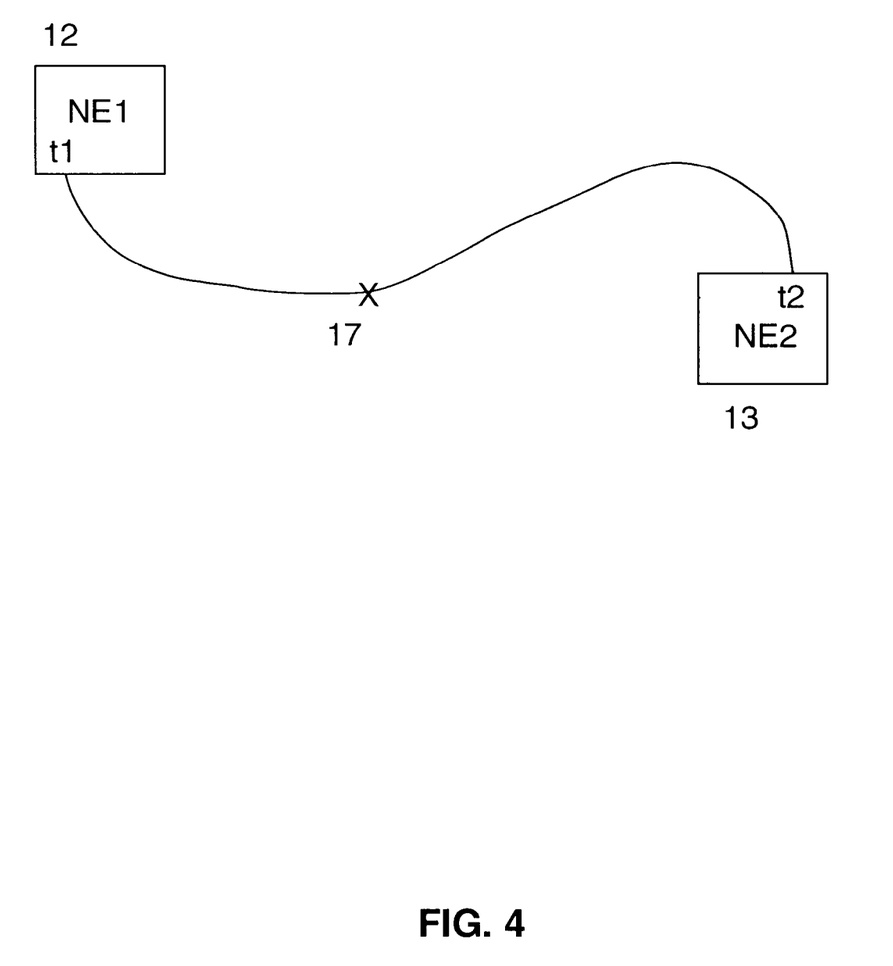
FIG. 4 is a representation of the second step of the method according to the present invention.

The correlation keys identify the broken link as it is seen by the neighbouring node respectively. E.g. the node 12 builds the correlation key by identifying the link t1 to the node 13 as it is seen from the node 12, and the node 13 builds the correlation key by specifying the link t2 as the node 13 sees it to connect itself to the node 12. Thus the correlation key that is built in the node 12 contains the t1 information and the correlation key that is built in the node 13 contains the t2 information.

3. Physical alarms are then triggered with the correlation key in them, as described in FIG. 5.

Figure 5:
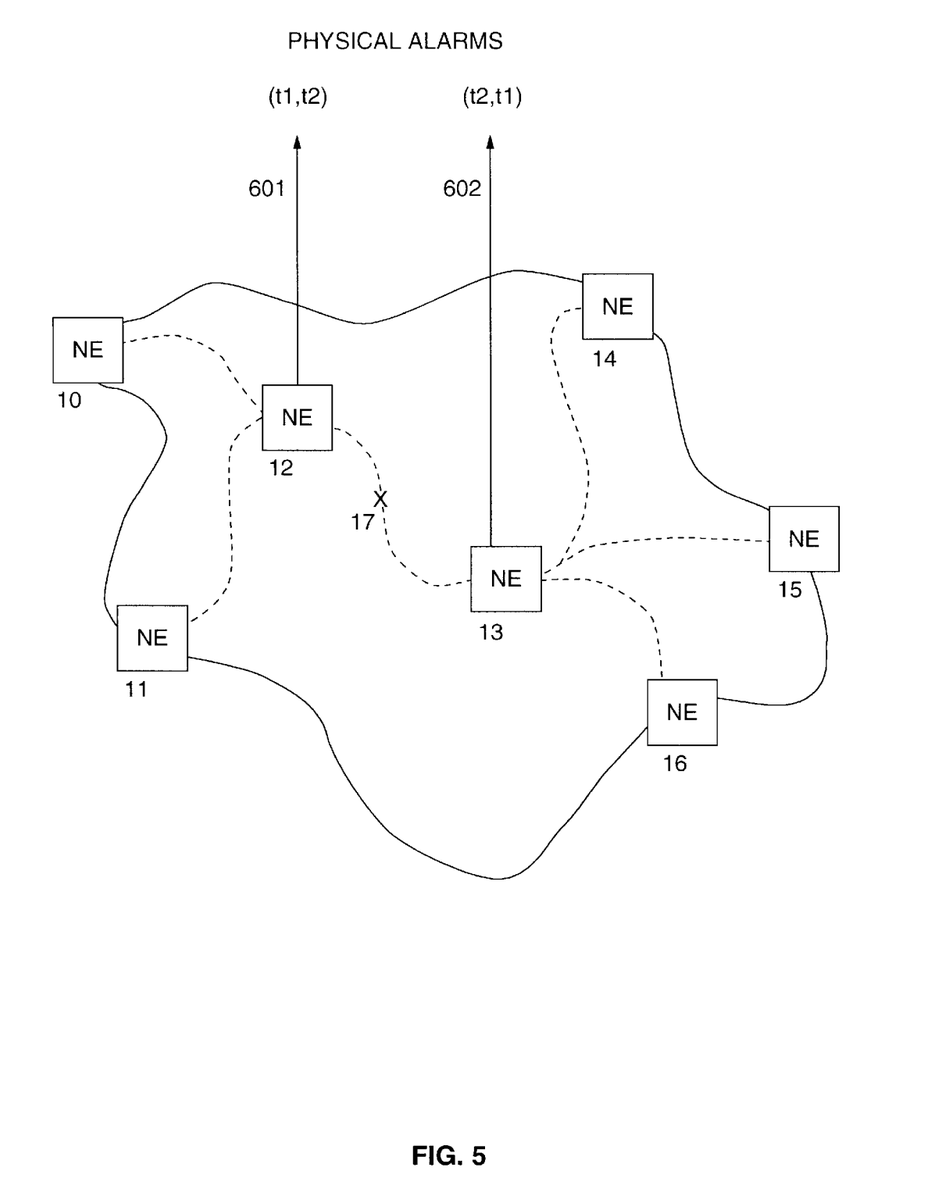
FIG. 5 is a representation of the third step of the method according to the present invention.

Each node (i.e. 12 and 13) discovering the physical resource failure, triggers the physical alarm containing a correlation vector comprising firstly the correlation key of the own node, and secondly the correlation key of the node on the other side of the broken link. The physical alarm 601 of the node 12 contains therefore a correlation vector (t1, t2) with the correlation key of the node 12 (t1) and the correlation key of the node 13 (t2), whereas the physical alarm 602 of the node 13 contains a correlation vector (t2, t1) comprising the correlation key of node 13 (t2) and the correlation key of the node 12 (t1).

Figure 6:
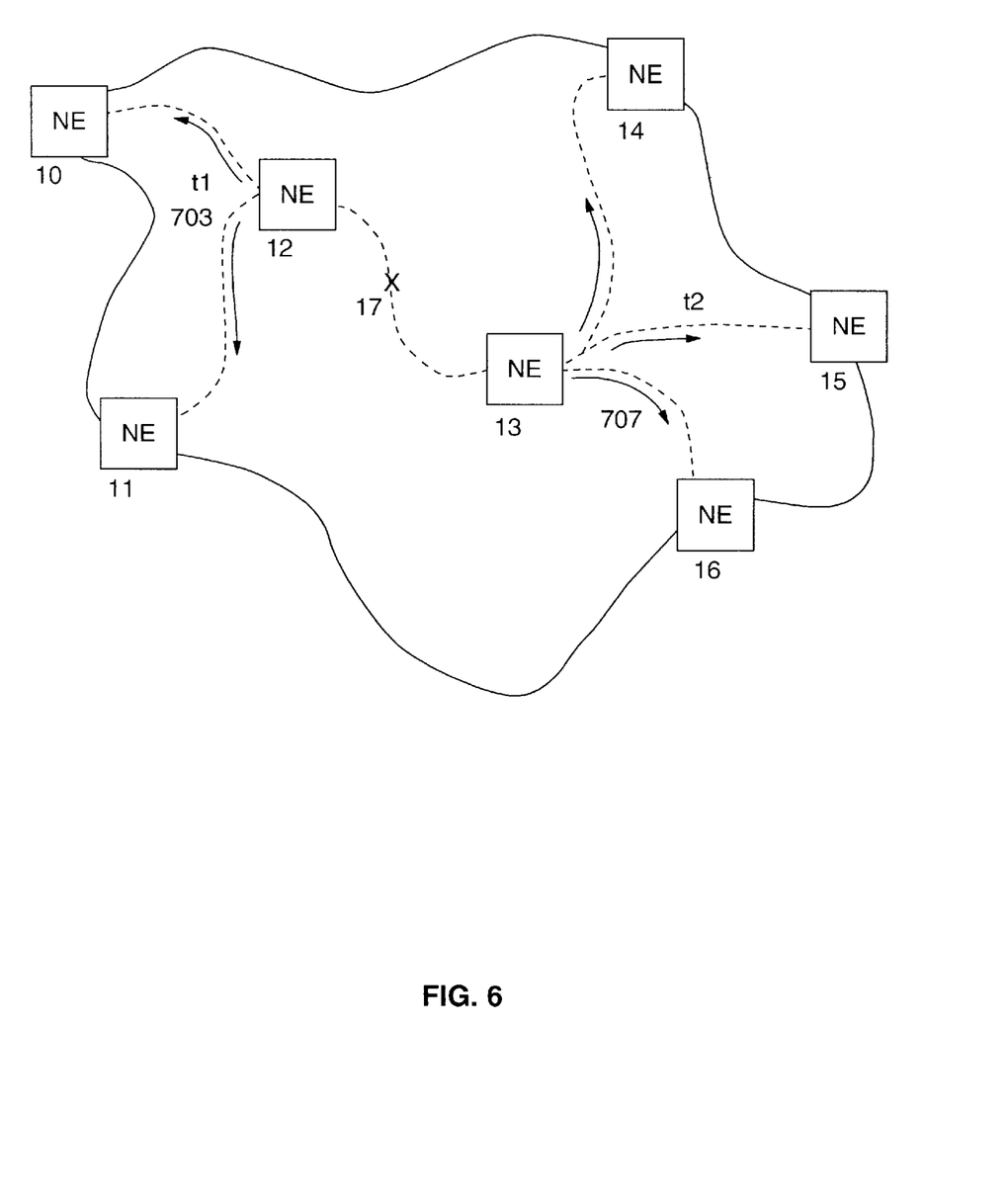
FIG. 6 is a representation of the fourth step of the method according to the present invention.

4. The failure information and the correlation keys 703, 707 are transported to the access nodes, as illustrated in FIG. 6. From the node 12, the correlation key 703 (made of t1) will be transported to the nodes 10 and 11. From the node 13, the correlation key 707 (made of t2) will be transported to the nodes 14, 15 and 16.

Figure 7:
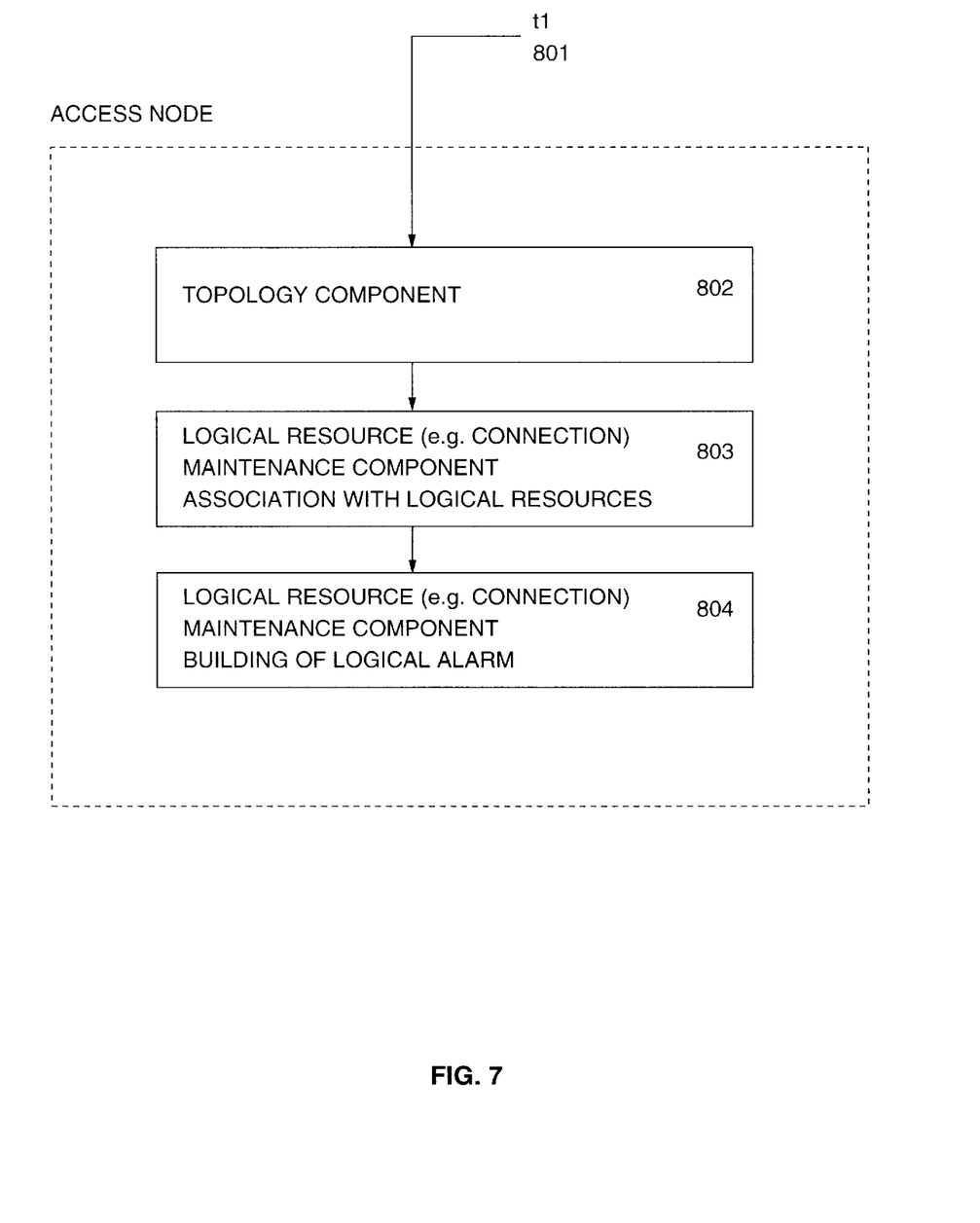
FIG. 7 is a representation of the fifth step of the method according to the present invention.

5. In the access nodes, the information of the correlation key is combined with information of the affected logical resources. FIG. 7 represents a method to perform this combination:

- the incoming correlation key 801 enters the access node, the component 802 is in charge of maintaining the knowledge on the network topology, receives the correlation key 801 and sends it to the component 803,
- the component 803 in charge of maintaining the knowledge on logical resources performs the association of the physical failure with the affected logical resources it handles,
- an alarm, which is related with the network topology, the logical resources and which also includes the correlation key 801 that has been delivered to the access nodes, is then built in step 804.

6. The logical alarm and the correlation key are logged in the access node, according to the log configuration characteristics. If the Event Discriminator has been configured to process notifications related to connections and to Communication alarms, then the notification will be sent to the log storage of the Network Management.

Thus, the Network Management log will contain: identification of logical resources affected by the failure, and correlation vector associated with the broken physical resource.

Figure 8:
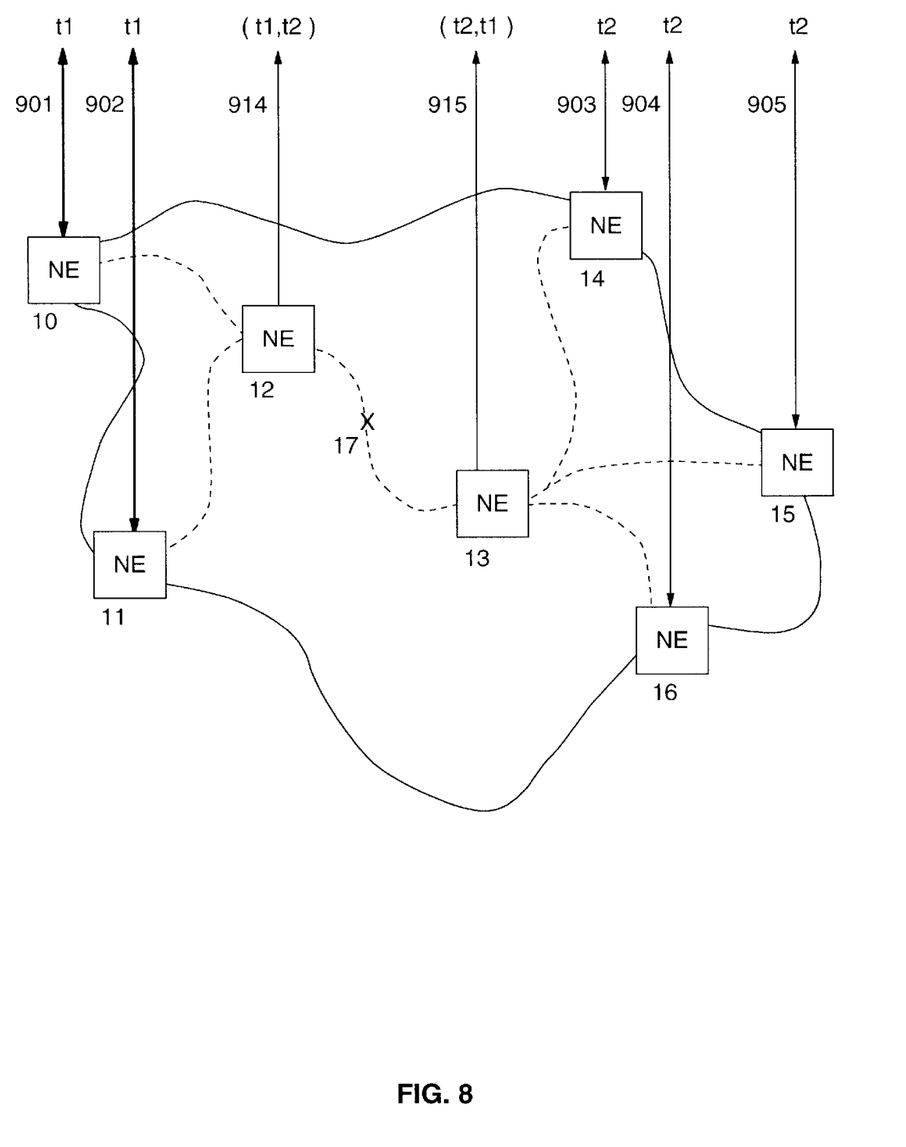
FIG. 8 is a representation of the seventh step of the method according to the present invention.

7. On reception of the physical alarm, the operator can ask to retrieve the log information from the access nodes for analysis as illustrated in FIG. 8.

The operator will see 2 physical alarms (i.e. 914 and 915) each one containing an correlation vector with the information on the broken resource as identified by the local nodes, e.g. (t1, t2) for node 12, and (t2, t1) for node 13. Either when the content of the log storage has reached its configured threshold or on explicit request from the operator, the log information will be retrieved for correlation process as illustrated by 901, 902, 903, 904, 905 from nodes 10, 11, 14, 15 and 16. The correlation process can then correlate affected logical resources based on the correlation keys (t1, t2) as found in the log storage.

We claim:

1. A method of identifying a connection failure in a network having a plurality of network nodes interconnected by a plurality of links over which connections between source and destination nodes are established, the method being implemented in each of the network nodes adjacent the connection failure and comprising the steps of:

upon detection of the failure, storing failure-related information in local memory;

generating a correlation key based on the stored failure-related information to uniquely identify the connection failure; and transmitting the correlation key to each node in the network still accessible through a connection affected by the failure.

2. A method as set forth in claim 1 including the additional step of sending a failure alarm to a network management system.

3. A method as set forth in claim 2 wherein the correlation key includes a two part link identifier, the first part identifying the link affected by the failure from the perspective of the local node and the second part identifying the link affected by the failure from the perspective of the remote node also adjacent the connection failure, the two parts providing in combination a unique identifier of the connection failure.

* * * * *